United States Patent [19]
Möker

[11] Patent Number: 6,004,084
[45] Date of Patent: Dec. 21, 1999

[54] LOAD-SECURING ARRANGEMENT FOR A LOADING SPACE OF A MOTOR VEHICLE

[75] Inventor: Carsten Möker, Rühen, Germany

[73] Assignee: Volkswagen, AG, Wolfsburg, Germany

[21] Appl. No.: 08/895,347

[22] Filed: Jul. 16, 1997

[30] Foreign Application Priority Data

Jul. 16, 1996 [DE] Germany .......................... 196 28 626

[51] Int. Cl.⁶ .................................................. B60P 7/08
[52] U.S. Cl. .......................... 410/118; 410/117; 410/119; 410/129; 296/24.1; 280/749
[58] Field of Search ................... 410/117, 118, 410/119, 121, 129; 224/42.34, 42.33; 296/24.1, 37.1, 37.5, 37.6, 37.8; 280/749

[56] References Cited

U.S. PATENT DOCUMENTS

| | | | |
|---|---|---|---|
| 4,202,577 | 5/1980 | Breitschwerdt et al. | 296/24.1 |
| 5,026,231 | 6/1991 | Moore | 410/118 |
| 5,288,122 | 2/1994 | Pilhall | 296/24.1 |
| 5,702,143 | 12/1997 | Shimazaki | 296/24.1 |
| 5,772,370 | 6/1998 | Moore | 410/100 |
| 5,833,413 | 11/1998 | Cornelius | 410/119 |
| 5,839,757 | 11/1998 | von Lange et al. | 410/118 X |

FOREIGN PATENT DOCUMENTS

| | | |
|---|---|---|
| 599 810 | 6/1994 | European Pat. Off. . |
| 1430358A | 10/1969 | Germany .......................... 224/42.33 |
| 4300904A1 | 7/1993 | Germany .......................... 410/118 |
| 43 26 198 | 2/1994 | Germany . |
| 42 39 492 | 4/1994 | Germany . |
| 295 00 366 U | 4/1995 | Germany . |
| 44 26 882 | 10/1995 | Germany . |

*Primary Examiner*—Stephen T. Gordon
*Attorney, Agent, or Firm*—Cohen, Pontani, Lieberman & Pavane

[57] ABSTRACT

A load-securing arrangement for a loading space of a motor vehicle, in particular of a station wagon. During normal travel, a restraining device is accommodated, in a not-in-use position, in the region of at least one loading-space boundary wall and assumes a position in which it does not restrict the loading space. The restraining device is connected to an actuable displacement device which can be activated via a signal of a crash sensor and, once activated, displaces the restraining device into a use position, in which any load is kept away from a passenger compartment. This load-securing arrangement functions automatically and may preferably be designed in the manner of a restraining barrier with belts and/or air bags.

24 Claims, 2 Drawing Sheets

LOAD-SECURING ARRANGEMENT FOR A LOADING SPACE OF A MOTOR VEHICLE

BACKGROUND OF THE INVENTION

1. Field of the Invention

The invention relates to a load-securing arrangement for a loading space of a motor vehicle.

2. Description of the Prior Art

In a known load-securing system of the generic type (DE 44 26 882 C1), in particular for use in station wagons, compartments are formed by means of an elastic belt for the purpose of receiving a load. Provided for this purpose in a belt retractor fixed to the vehicle is a storable belt which, in order to form suitable compartment sizes, can be deflected via deflection fittings distributed in the loading space. The belt retractor is provided with an arresting means for arresting the tensioning-belt withdrawal in the event of rapid withdrawal movements.

Such a load-securing system requires a high degree of effort and expense as a result of the large number of deflection fittings, and is complicated to handle since a suitable tensioning-belt guide has to be found in each case for different loads or a number of load items.

In a load-lashing arrangement, in particular for trucks or delivery vans, which is also known, belts with fastening elements are fitted on the inner surfaces of the side walls of the loading space. A transverse belt can be connected to the side belts via tensioning buckles and can be used to tension the load which is to be secured against the front wall of the loading space. In trucks, the front wall of the loading space with respect to the driver's cab is of relatively rigid design, so that it may be expedient here to lash the load against the front wall with an abutment connection. In cars, by contrast, the front wall of the loading space cannot be subjected to such high loading. In particular in station wagons, the front wall is formed by rear-seat-bench backrests which can be swung over and cannot be subjected to high loading, so that a restraining barrier formed by this means is limited to only lightweight loads. This load-securing arrangement thus cannot be used here in practice.

In a known load-lashing arrangement (DE 295 00 366 U1) for motor vehicles, a belt retractor is provided with a belt which can be unrolled and retracted in a spring-assisted manner and can be guided to a fastening point via a multiplicity of deflection fittings in the loading space. Here too, a suitable lashing position for the load and a corresponding belt guide have to be established before the start of the journey, and this involves a high degree of effort. Nevertheless, the load can slip if the belt guidance is unsatisfactory, in which case the securing function is reduced or not performed at all. In a specific embodiment, the belt, once fastened, may, if required, be tensioned via a tensioning lever using physical strength, in addition to the spring force of the retractor. All in all, handling requires a high degree of outlay.

In station wagons, the rear loading space can routinely be enlarged in that the rear-seat bench can be swung up around a front spindle into a vertical position and the backrest can be swung horizontally into the resulting free space. In the event of such a vehicle being involved in a head-on collision, any non-lashed load can be flung against the rear-seat bench, which, with the loading space enlarged, has been swung up vertically and thereby acts as a barrier. In order to increase the stability of such a barrier and to relieve the rear-seat bench of loading, a safety locking means is known from German reference DE 42 39 492 A1. Additionally fitted for this purpose, at the top corners of the swung-over rear-seat bench, are belt buckles, which are each connected to the rear-seat belt which is provided anyway, so that the top part of the rear-seat bench is braced, and secured, in the rearward direction. It is not possible to use this arrangement to fix any load in the loading space. Rather, in the event of a collision, the load is allowed to shift up against the swung-up rear-seat bench. In addition, this safety locking means only functions when the loading space is enlarged, with the rear-seat bench swung over.

In a barrier arrangement, a so-called belt bar is fastened on the backrest of the rear-seat bench, extends over the entire width of the interior and is supported in strong anchoring means. Fastening points for headrests and three-point safety belts are arranged on this belt bar. In this case, the backrest is divided and the belt bar is fastened on a wider part of the backrest. When the smaller backrest part is swung over, the belt bar thus remains in position and, when the two backrest parts are swung over to the full extent, the bar is swung over with them. This belt bar thus blocks the passage when the smaller backrest part is swung over and loses much of its safety function when, for the purpose of enlarging the loading space, it is swung over forwards together with the wider backrest part.

Safety-belt systems are also known as restraining means for vehicle occupants, which, in addition to a belt retractor with withdrawal-arresting means, have a pretensioning device for eliminating the belt slack in the event of a collision. (see for example EP 0 599 810 A2). For this purpose, an acceleration sensor determines a triggering deceleration and triggers a pretensioning mechanism for retracting the belt slack. In a similar arrangement (taught by DE 43 26 198 A1), the retraction of the belt is terminated once the belt loading has reached a predetermined value. These arrangements serve only to retract the belt slack in the event of a collision, the safety belt, however, must be fastened beforehand. In order to transfer such an arrangement to a known load-securing arrangement with belts, the load would thus have to be lashed with belts from the outset.

SUMMARY OF THE INVENTION

The object of the present invention is to provide a load-securing arrangement that it functions largely automatically and which, during normal travel, does not restrict the loading space with restraining means.

Pursuant to this object, and others which will become apparent hereafter, one aspect of the present invention resides in a load-securing arrangement having load restraining means for keeping a load in the loading space away from the passenger compartment. The load restraining means is operable between two positions including a first, rest position during normal vehicle travel and a second, actuated position in which the restraining means is displaced so as to keep the load away from the passenger compartment. The restraining means is configured to be in a region of at least one of the walls of the loading space in the rest position so as to not restrict the loading space. The securing arrangement further includes means for actuating the restraining means so that the restraining means is displaced into the actuated position.

During normal travel, the restraining means, in particular comprising at least one belt and/or at least one netting and/or at least one air bag, is fitted, in a not-in-use position, on boundary walls of the loading space, as a result of which the loading space is not restricted. The restraining means can also be comprised of a plurality of independent parts. Depending on the type of restraining means used, and on the conditions in an actual vehicle, in the not-in-use position, the restraining means may be retained in side walls bounding the loading space and/or in the floor of the loading space and/or in the vehicle ceiling and/or in the backrest.

The restraining means is connected to an actuable displacement device which can be activated via a signal from an acceleration sensor, as a crash sensor, and, once activated, displaces the restraining means into a use position, in which the load is kept away from the passenger compartment.

The position of the restraining means in the use position may be selected such that, in the event of a crash, the front region of the loading space is provided with a barrier for any forward-shifting load. Such a barrier may be provided by belts or nettings which have been tensioned by the displacement device or by rigid barrier parts and activated air bags or combinations thereof. With appropriate arrangement of the displacement device, such a barrier can be displaced counter to any forward-shifting load.

The use position of the restraining means or of an additional restraining means may also be such that, at the start of a detected collision, any load is immediately intercepted and fixed by the restraining means, in the form of belts or nettings, so that relative movement of the load in the direction of the passenger compartment is prevented.

Advantageously, the load-securing arrangement according to the invention operates automatically, so that even a load which has not been lashed prior to triggering is restrained, and secured, with respect to the passenger compartment in the event of a collision. Here too, it is possible for the parts of the restraining means to be fitted such that, during normal travel, they do not obstruct the loading space.

The deceleration threshold value for activating the restraining means may be selected to be lower than that for passenger-restraining systems, so that it is possible for the load-securing arrangement to be activated even in the case of relatively low deceleration values, for example in the event of extreme braking actions.

Passenger-restraining systems which can be triggered in a deceleration-dependent manner and have a corresponding crash sensor system are usually provided anyway in modern vehicles, so that the load-securing arrangement according to the invention can be connected to this crash sensor system without any additional outlay in terms of sensors.

Since the load-securing arrangement according to the invention is triggered extremely infrequently via the acceleration sensor and otherwise remains in the not-in-use position, the belts, nettings, etc. used may be accommodated in recesses and covered in an aesthetically pleasing manner by covers which can be released in the event of activation.

As actuating means for displacing the restraining means, use may be made of mechanically prestressed drives and/or pyrotechnic drives, it being possible, at least in part, to fall back on conventional, tried and tested methods which are known in conjunction with passenger safety belts.

In a preferred, specific embodiment, a belt barrier comprising at least one belt is provided in the region behind the backrest and is retained so as to run transversely across the backrest. The belt ends are secured, in the lateral region of the loading space, on belt retractors with belt-pretensioning devices. The belt can also be secured at one end, in particular in a releasable manner, with a belt buckle. With a triggering deceleration determined, this belt barrier is then tensioned for loading by any forward-shifting load and, if appropriate, is moved in the direction of the load. For this purpose, it is possible for the belt arrangement, during the tensioning operation, to be released from the backrest, for example by way of a clip connection.

If it is not intended to use this load-securing arrangement, the belt arrangement may be released at the corresponding belt buckles and belt tongues, it being possible for the connection state to be shown, via contact switches expediently, in the field of view of the driver.

Combinations of transverse belts and nettings tensioned therebetween are advantageous for a large-surface-area barrier.

In a further preferred embodiment, at least one air bag is arranged in a rear, top region of the backrest which can be swung over forwards. The air bag can inflate both when the backrest is in the swung-up position and when it is in the swung-over position and, in each case, can form a barrier against any forward-shifting load.

BRIEF DESCRIPTION OF THE DRAWINGS

Exemplary embodiments of the invention are explained in more detail with reference to a drawing, in which.

DETAILED DESCRIPTION OF THE PREFERRED EMBODIMENTS

Figure 1:
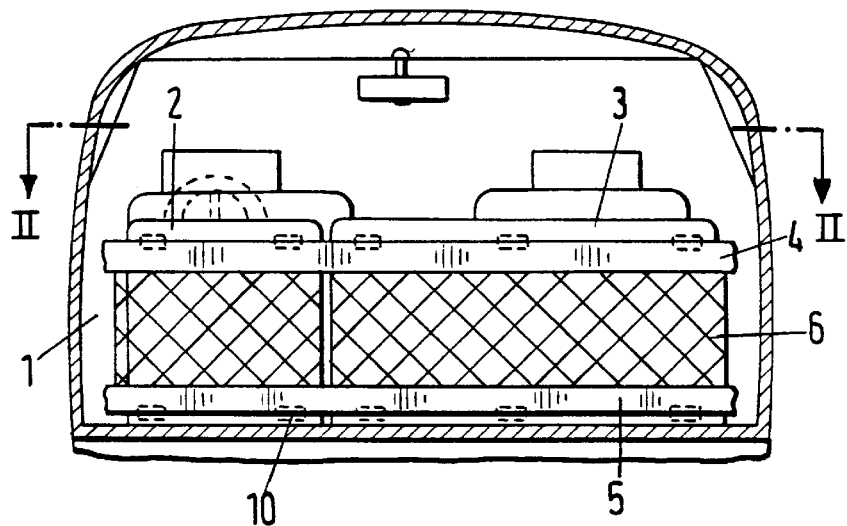
FIG. 1 shows a view, from the rear along the line I—I in FIG. 2, into the loading space of a station wagon, with a partial view of a load-securing arrangement.
Figure 2:
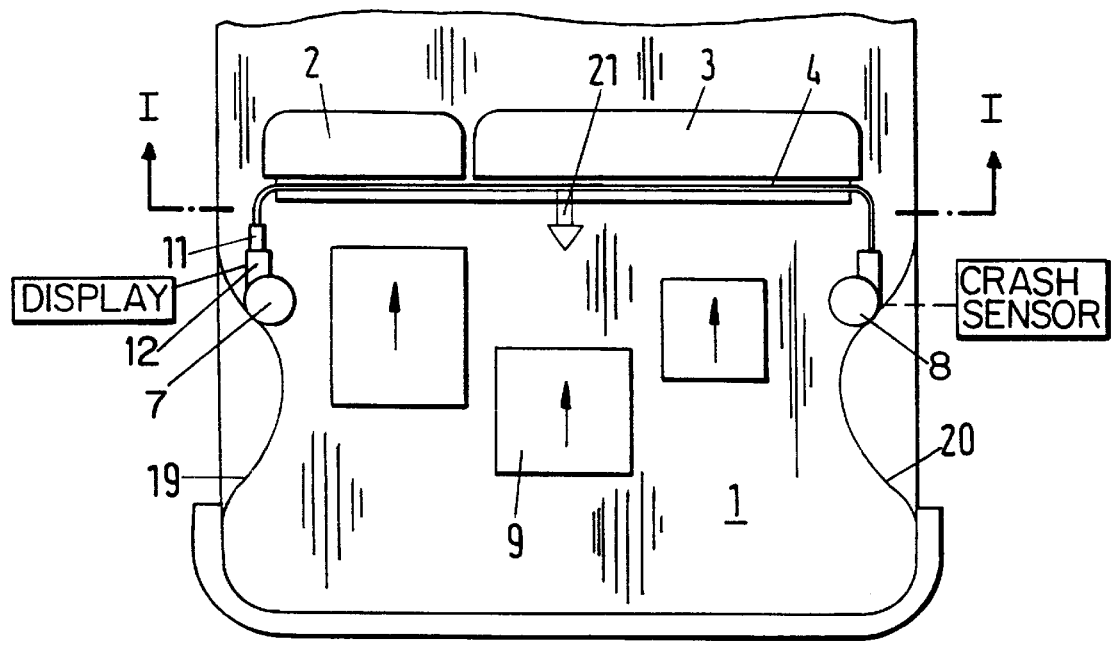
FIG. 2 shows a plan view of the loading space as a section along line II—II in FIG. 1.

FIGS. 1 and 2 illustrate sections in the region of a loading space 1 of an estate car. The front of the loading space 1 is formed by a divided backrest which can be swung over and comprises a narrow backrest part 2 and a wider backrest part 3. Fastened in the rear region of the backrest 2, 3, at the top and bottom, are transversely running belts 4, 5, between which a netting 6 is tensioned. The end regions of the belts 4, 5 are deflected and connected to belt retractors 7, 8 and are retracted there such that the belts 4, 5 can be drawn out counter to spring prestressing. In addition, the belt retractors 7, 8 contain integrated belt-pretensioning devices. These contain a mechanically prestressed drive (not illustrated) and/or a pyrotechnic drive, which can be triggered by a crash sensor (not illustrated) for a pretensioning operation.

The belt retractors 7, 8 are fitted, together with the associated belt-pretensioning devices, in the region in front of wheel wells 19, 20, without reducing the loading space to any great extent.

The load-securing arrangement illustrated has functions as follows:

In the event of a collision or other extreme situations with pronounced vehicle deceleration, an acceleration sensor activates the belt-pretensioning device, so that the arrangement comprising the belts 4, 5 and the netting 6 is tensioned as a restraining barrier on the backrest 2, 3. Any forward-shifting load 9 is thereby restrained without the backrest 2, 3 being subjected to high loading.

Tear-away connecting elements 10 for connecting the belts 4, 5 to the backrest 2, 3 are illustrated schematically by dashed lines in FIG. 1. Using such connecting elements 10 means that, on account of the rearwardly offset arrangement of the belt retractors 7, 8 with the belt-pretensioning devices, the restraining barrier is drawn away from the rear-seat backrest 2, 3, in the event of triggering, and moves in its entirety towards the forward-shifting load 9 (arrow 21). This means that the load 9 can be braked even before it reaches the backrest 2, 3.

When one or both backrest parts 2, 3 is or are swung over, the barrier arrangement comprising the belts 4, 5 and the netting 6 is likewise carried along forwards therewith, the necessary belt lengths being released from the belt retractors 7, 8 with a slow pulling movement. Even in this position, a restraining barrier is provided in the event of triggering, in particular in the case of the belts 4, 5 being releasable from the backrest.

In a somewhat modified embodiment, one end of the belts 4, 5 may be secured fixedly or, preferably, releasably. This is indicated in FIG. 2 by a belt tongue 11, which then engages in a belt buckle 12, it thus being possible for the belt retractor 7 to be dispensed with. If the load-securing arrangement is not required and, in particular, when the backrest parts 2, 3 are swung forwards, the belts may then be released. The belt tongue 11 can actuate a contact switch (not illustrated), the switching position of which can be shown on the dashboard to indicate whether or not the belts are in place.

Figure 3:
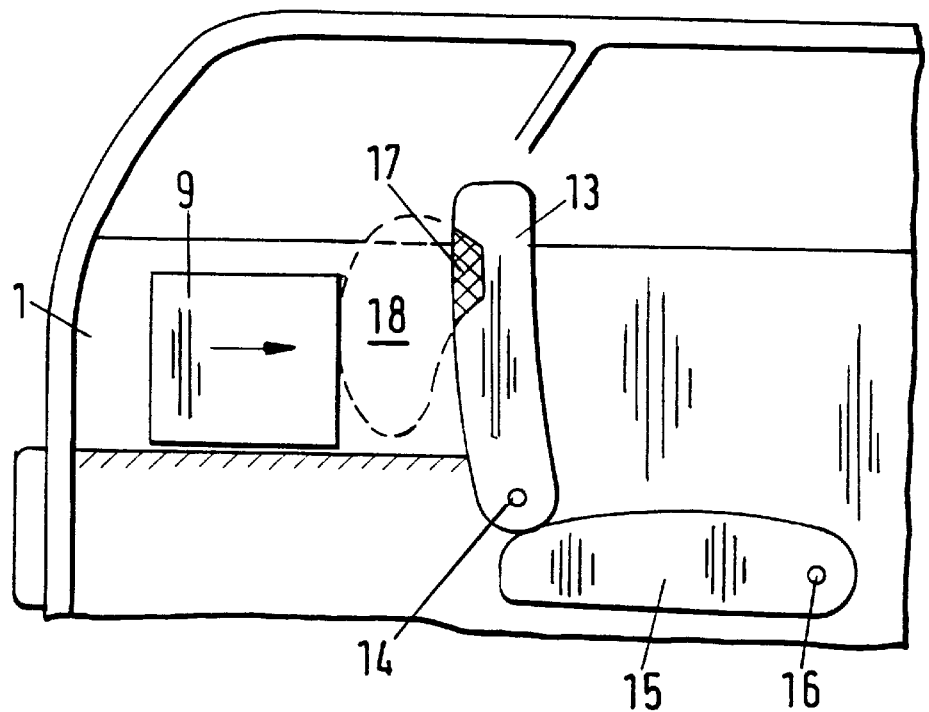
FIG. 3 shows a schematized side view of a loading space of an estate car with a second embodiment of a load-securing arrangement.
Figure 4:
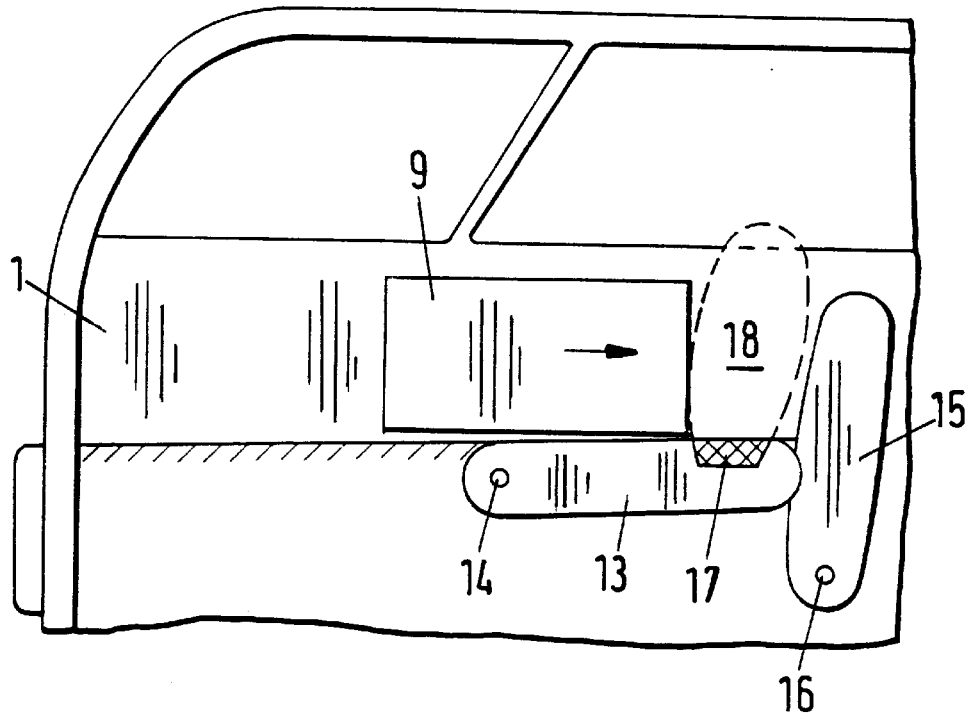
FIG. 4 shows the arrangement according to FIG. 3 with a backrest in a swung-over position.

FIGS. 3 and 4 show an alternative embodiment of a load-securing arrangement. In this case, too, the front of a loading space 1 of a station wagon is bounded by a backrest 13, which can be swung over forwards around a bottom spindle 14. An associated seat cushion 15 can be swung up, around a spindle 16, into an approximately vertical position and, according to FIG. 4, with the loading space enlarged and the backrest 13 swung over, forms the front wall of the enlarged loading space.

An air bag 17 is arranged in a sunken manner in a rear, top region of the backrest 13 and can inflate away from the backrest 13 in the event of triggering.

The post-triggering state with the backrest 13 in the upright position is illustrated in FIG. 3. In this case, the inflated air bag 17 (depicted by dashed lines) forms a shock-absorbing barrier 18 for any forward-shifting load 9.

FIG. 4 shows the triggering scenario when the backrest 13 has been swung over, and, here too, the inflated air bag 17 forms an upwardly oriented compliant and shock-absorbing barrier 18. The barrier and shock-absorbing functions of the air bag 17 are thus ensured in both positions of the backrest 13.

I claim:

1. A combination comprising:
   a vehicle having a passenger compartment, and loading space walls, a loading space floor and a vehicle ceiling which define a loading space arranged behind the passenger compartment, the vehicle further having a seat backrest which forms one of the loading space walls; and
   a load-securing arrangement including load restraining means for keeping a load in the loading space away from the passenger compartment, the restraining means being operable between two positions including a first, rest position during normal vehicle travel and a second, actuated position in which the restraining means is displaceable so as to keep the load away from the passenger compartment, the restraining means being in a region of at least one of the loading spaced walls in the rest position so as to not restrict the loading space, the load securing arrangement further including means for actuating the restraining means so that the restraining means is displaced into the actuating position.

2. A combination according to claim 1, wherein the actuating means includes an acceleration sensor operative to actuate the restraining means.

3. A combination according to claim 2, wherein the acceleration sensor is a crash sensor.

4. A combination according to claim 3, wherein the crash sensor is part of a crash sensor system provided in the vehicle for passenger safety, the crash sensor system having a down stream triggering unit, the actuating means being connected to the triggering unit for activation.

5. A combination according to claim 1, wherein the actuating means includes at least one of a mechanically prestressed drive and a pyrotechnic drive.

6. A combination according to claim 1, wherein the restraining means includes parts that are mountable, in the rest position of the restraining means, in at least one of the sidewalls of the loading space, the floor of the loading space, the ceiling of the vehicle and the backrest.

7. A combination according to claim 1, wherein the restraining means includes at least one of a belt, a netting and an airbag.

8. A combination according to claim 7, wherein the restraining means includes at least one belt arranged in a region behind the backrest so as to run transversely across the backrest, the restraining means further including a belt retractor fixed in a lateral region of the loading space, the actuating means including a belt-pretensioning device operatively connected to the belt retractor, one end of the belt being connected to the belt retractor so that in the actuated position the belt is pretensioned to form a belt barrier for any forwardly shifting load.

9. A combination according to claim 8, and further comprising a belt buckle fixed in the loading space, the belt having a second end provided with a tongue releasably connectable to the buckle.

10. A combination according to claim 9, and further comprising a contact switch mounted on the belt buckle so as to be actuable by engagement of the tongue, and display means operatively connected to the contact switch for showing an engagement state of the belt to a vehicle operator.

11. A combination according to claim 7, wherein the restraining means includes a top belt, a bottom belt, and a netting connected therebetween.

12. A combination according to claim 1, wherein the backrest can be pivoted forward, the restraining means including at least one airbag arranged in a rear, top region of the backrest, the airbag being configured to inflate rearwardly into the loading space when the backrest is in an upright position and inflate upwardly at a front end of the loading space when the backrest has been pivoted forward.

13. A load securing arrangement for a load restraining space of a motor vehicle, the loading space being arranged behind a passenger compartment of the vehicle and being bounded by loading-spaced walls, a loading space floor and a vehicle ceiling, a seat backrest forming one of the loading space walls, the load securing arrangement comprising:
   load restraining means for keeping a load in the loading space away from the passenger compartment, the restraining means being operable between two positions including a first, rest position during normal vehicle travel and a second, actuated position in which the restraining means is displaced so as to keep the load away from the passenger compartment, the restraining means being configured to be in a region of at least one of the loading space walls in the rest position so as not to restrict the loading the space, the restraining means including at least one belt arranged in a region behind the backrest so as to run transversally across the backrest, the restraining means further including a belt retractor fixed in a lateral region of the loading space;

means for actuating the restraining means so that the restraining means is displaced into the actuated position, the actuating means including a belt-pretensioning device operatively connected to the belt retractor, one end of the belt being connected to the belt retractor so that in the actuated position the belt is pretensioned to form a belt barrier for any forwardly shifting load;

a belt buckle fixed in the loading space, the belt having a second end provided with a tongue releasably connectable to the buckle;

a contact switch mounted on the belt buckle so as to be actuable by engagement of the tongue; and display means operatively connected to the contact switch for showing an engagement state of the belt to a vehicle operator.

14. A load-securing arrangement according to claim 13, wherein the actuating means includes an acceleration sensor operative to actuate the restraining means.

15. A load-securing arrangement according to claim 14, wherein the acceleration sensor is a crash sensor.

16. A load-securing arrangement according to claim 15, wherein the crash sensor is part of a crash sensor system provided in the vehicle for passenger safety, the crash sensor system having a down stream triggering unit, the actuating means being connected to the triggering unit for activation.

17. A load-securing arrangement according to claim 13, wherein the actuating means includes at least one of a mechanically prestressed drive and a pyrotechnic drive.

18. A load-securing arrangement according to claim 13, wherein the restraining means includes parts that are mountable in the rest position of the restraining means, in at least one of the sidewalls of the loading space, the floor of the loading space, the ceiling of the vehicle and the backrest.

19. A load-securing arrangement for a loading space of a motor vehicle, the loading space being arranged behind a passenger compartment of the vehicle and being bounded by loading-space walls, a loading space floor and a vehicle ceiling, a seat backrest forming one of the loading space walls, the load-securing arrangement comprising:

load restraining means for keeping a load in the loading space away from the passenger compartment, the restraining means being operable between two positions including a first, rest position during normal vehicle travel and a second, actuated position in which the restraining means is displaced so as to keep the load away from the passenger compartment, the restraining means being configured to be in a region of at least one of the loading space walls in the rest position so as not to restrict the loading space, the restraining means including a top belt, a bottom belt, and a netting therebetween; and means for actuating the restraining means so that the restraining means is displaced into the actuated position.

20. A load-securing arrangement according to claim 19, wherein the actuating means includes an acceleration sensor operative to actuate the restraining means.

21. A load-securing arrangement according to claim 20, wherein the accelerator sensor is a crash sensor.

22. A load-securing arrangement according to claim 21, wherein the crash sensor is part of a crash sensor system provided in the vehicle for passenger safety, the crash sensor system having a down stream triggering unit, the actuating means being connected to the triggering unit for activation.

23. A load securing arrangement according to claim 19, wherein the actuating means includes at least one of a mechanically prestressed drive and a pyrotechnic drive.

24. A load-securing arrangement according to claim 19, wherein the restraining means includes parts that are mountable, in the rest position of the restraining means, in at least one of the sidewalls of the loading space, the floor of the loading space, the ceiling of the vehicle and the backrest.

* * * * *